Dec. 25, 1956  W. H. MIDDLETON ET AL  2,775,306
RELEASABLE COUPLING FOR WELL TOOLS
Filed Aug. 24, 1953
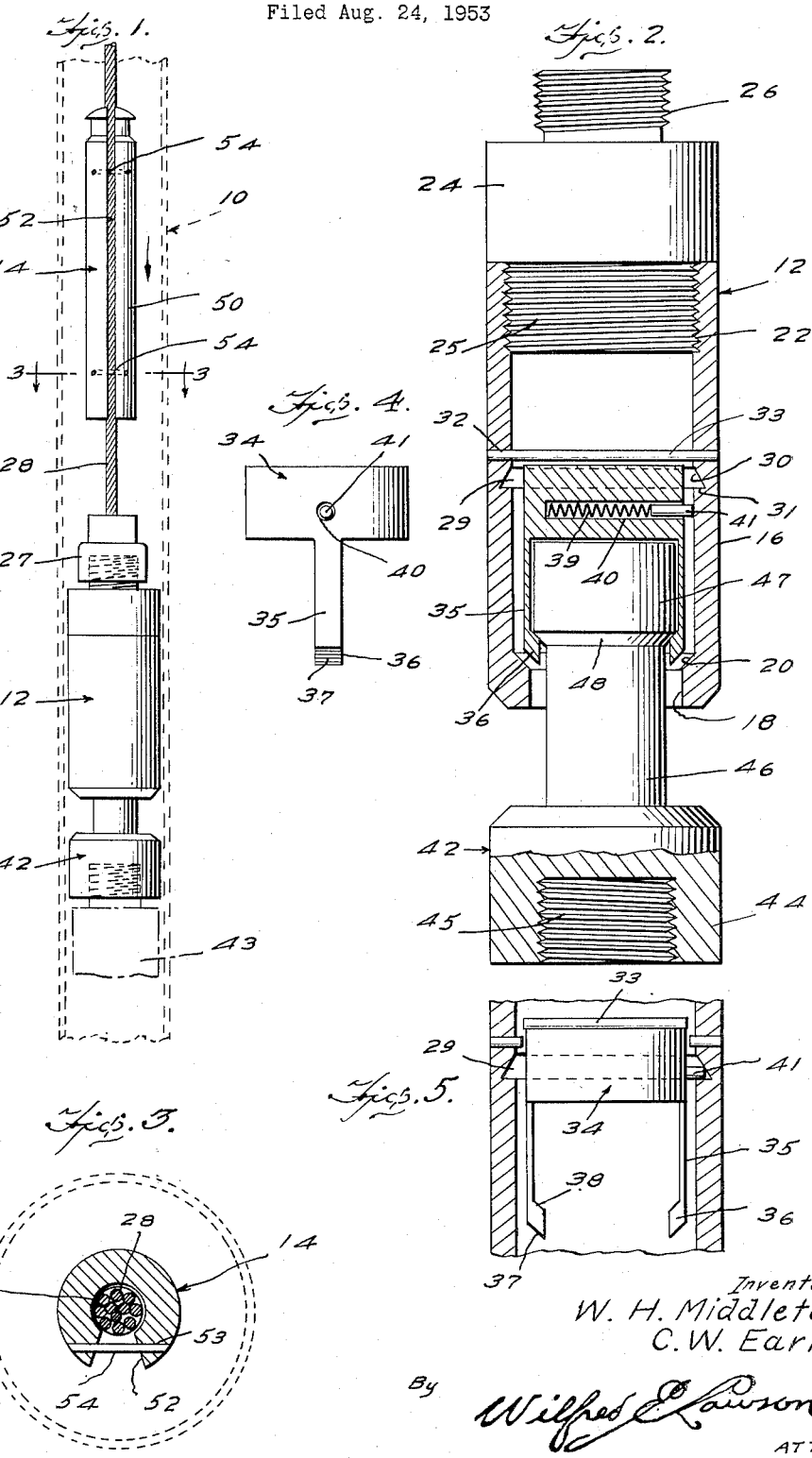
Inventors
W. H. Middleton
C. W. Earl
By Wilfred E. Lawson
ATTY.

United States Patent Office 2,775,306
Patented Dec. 25, 1956

2,775,306

RELEASABLE COUPLING FOR WELL TOOLS

William H. Middleton, Hobbs, N. Mex., and
Charles W. Earl, Seminole, Tex.

Application August 24, 1953, Serial No. 375,875

2 Claims. (Cl. 166—219)

This invention relates to well apparatus and more particularly to a releasable coupling for connecting a cable or well string to a tool to be used in a well and for facilitating release of the cable or well string from a tool stuck in the well.

The present invention has for its principal object to provide a coupling or joint which is connected to the tool supporting cable and by means of which, if the swab or other tool becomes stuck in the well hole, the swab can be separated from the cable and the cable withdrawn, thereby eliminating the hazard of pulling the cable or line in two and losing the expensive cable.

Another object of the invention is to provide an improved coupling or joint which is designed in a novel manner to be released by a sliding weight applied to the cable and allowed to drop or fall freely and strike the top of the joint to effect the breaking of a shear pin and the subsequent release of the tool at the lower end of the cable, when an up pull is applied to the cable.

Another object of the invention is to provide a novel joint of the character stated which is designed so that it can be easily assembled for use, an upper section of the joint can be withdrawn with the cable for reuse.

Other objects and advantages of the invention will become apparent as the description of the same proceeds and the invention will be best understood from a consideration of the following detailed description taken in connection with the accompanying drawing forming a part of the specification, with the understanding, however, that the invention is not to be limited to the exact details of construction shown and described since obvious modifications will occur to a person skilled in the art.

In the drawing:

Figure 1 is a general view in side elevation of the lower end of a cable and showing the improved coupling joint connected thereto together with the striking weight moving downwardly on the cable toward the joint.

Figure 2 is a view, on an enlarged scale, partly in side elevation and partly in longitudinal section, of the joint set up or ready for use.

Figure 3 is a transverse section taken substantially on the line 3—3 of Figure 1.

Figure 4 is a view in side elevation of the dog unit.

Figure 5 is a partial sectional view showing the dog unit elevated and locked to the cylinder after a release has been effected.

Referring now more particularly to the drawing the numeral 10 designates a portion of a well casing which is shown in dotted outline while the numeral 12 generally designates the improved release joint or coupling and the numeral 14 generally designates the weight.

In accordance with the present invention the joint or coupling 12 comprises a hollow cylinder body 16 whose bore at its lower end is internally reduced in diameter as indicated at 18, providing the internal shoulder 20 for the purpose hereinafter set forth.

The upper end of the hollow cylinder 16 is internally screw threaded as indicated at 22.

Secured to the upper end of the hollow cylinder is the head 24 which is of cylindrical form and of the same outside diameter as the cylinder and the lower end of the head has the threaded stud 25 which is secured in the upper end of the cylinder while the upper end of the head carries the threaded stud 26, of smaller diameter than the stud 25.

The numeral 27 designates a rope socket with which the lower end of the tool suspending cable 28 is connected in the conventional manner and this socket is internally screw threaded for connection with the top stud 26 in the manner illustrated in Figure 1.

Within the cylinder 16, approximately midway between its ends, the wall is provided with the encircling groove 29 which has a sloping top wall 30 and a flat bottom wall 31.

Directly above the groove 29 the cylinder is provided with the diametrically opposite radial openings 32 which are designed to receive a shear pin 33 which extends transversely of the cylindrical body when the coupling joint is set up for use as shown in Figure 2.

Positioned in the lower end of the cylinder 16 below the shear pin 33 is a dog carrier in the form of a flat disk-shaped body 34 and this carrier has extending from the underside thereof the spring fingers 35 which carry the wedging dogs 36 at their lower ends. The overall diameter of the dog carrier body 34 is greater than the diameter of the opening 18 in the bottom of the cylinder 16 as shown and the top and bottom faces of the dogs 36 are inclined or sloped inwardly and downwardly as indicated at 37 and 38. The lower sloped faces 37 of the dogs are designed to rest on the sloping shoulder 20 in the manner hereinafter set forth.

The dog carrier body 34 has formed therein a radial passage 39 which opens through one side and in which is positioned an expansion spring 40 and a latch pin 41. The latch pin is in the outer end of the passage 39 and the spring 40 constantly tends to force the pin radially outwardly.

When the dog carrier is in position below the shear pin 33, the latch pin 41 is below the groove 29 and thus the spring holds the outer end of the pin 41 against the side of the cylinder but when the dog carrier moves upwardly, after the shear pin 33 is broken, the latch pin 41 snaps into the groove 29 and holds the dog carrier elevated in the manner illustrated in Figure 5.

Adapted for releasable connection with the lower end of the cylinder 16 is the tool holder which is generally designated 42 and which is coupled with the tool such as a swab or the like, a part of which is shown in broken lines in Figure 1 and generally designated 43.

The tool holder 42 comprises a lower member 44 which has a threaded socket 45 in its underside for connection with the tool and extending upwardly from this member 44 is an elongate stem 46 which terminates in the cylindrical head 47. The head 47 is of greater diameter than the stem 46 and is designed to fit snugly between the dog carrying spring fingers 35.

Between the head 47 and the stem 46 there is formed the outwardly and upwardly sloping shoulder 48 which is designed to rest upon the inclined top surfaces 38 of the dogs in the manner illustrated in Figure 2.

When the coupling joint is set up for use and lowered into the well hole or casing the dogs will form a locking connection between the head 47 and the lower end of the cylinder 16 by resting on the shoulder 20 and having the shoulder 48 resting upon their top surfaces and the shear pin will be in position above the dog carrier in the manner illustrated.

When it becomes necessary to release the tool 43, the weight 14 is dropped for the purpose of delivering a heavy blow to the top of the rope socket 27.

The weight 14 as shown comprises a long cylindrical body 50 having a passage 51 axially therethrough and a wall slot 52 extending longitudinally thereof and opening into the passage 51. The wall slot 52 is provided to facilitate the placing of the cable 28 into the weight body to position in the passage 51 and at the top and bottom ends of the weight body there are provided transverse aligned openings 53 which are directed across the slot 52 and are designed to receive cable retaining pins 54 as shown.

When the weight 14 drops it hits the rope socket 27 and drives the cylinder 16 downwardly on the neck portion 46 of the tool holder. The top of the dog carrier is thus forced upwardly against and breaks the shear pin 33 thus permitting the dog carrier to move upwardly in the cylinder until the latch pin 41 engages in the groove 29 or, if it passes the groove 29 in moving upwardly it will engage therein when an up pull is applied to the cylinder to cause the cylinder to rise with respect to the dog carrier and the tool holder.

The dogs 36 will thus be raised from the shoulder 20 and when a strong pull is applied to the cable and to the cylinder supported thereby, the inclined top surfaces of the dogs will be caused to slide outwardly against the shoulder 48 and thus release the head 47 of the tool holder permitting the head to pass downwardly through the bottom opening 18 of the cylinder thus freeing the stuck swab or other tool.

From the foregoing it will be seen that there is provided by the present invention a relatively simple coupling unit or joint by means of which a tool can be effectively released if and when necessary so that the well operator can retrieve and save the tool cable.

I claim:

1. A releasable coupling for connecting well tools and a well string or cable, said coupling comprising a hollow cylindrical body, an internal tapered shoulder adjacent the lower end of said body, means at the upper end of said body for connecting a well string or cable, an annular groove in the inner wall of said body intermediate the length thereof, said groove having an outwardly and downwardly sloping top wall, diametrically opposed apertures in the wall of said body above said groove, a shear pin disposed in said apertures and extending across said body, a dog carrier slidably disposed in said body between said shear pin and said shoulder, said dog carrier comprising a disk-shaped portion having diametrically disposed spring fingers depending therefrom, said fingers terminating in dogs having downwardly and inwardly inclined upper and lower faces, a radial bore in said portion open at one side, a pin slidably disposed in said bore, resilient means urging said pin outwardly of said bore into engagement with the inner surface of said body and a tool connecting member having an elongated stem terminating in an enlarged cylindrical head with a downwardly and inwardly inclined shoulder connecting said head and said stem, said head being received between said fingers with the upper faces of said dogs engaging the inclined shoulder between said head and said stem and with the lower faces of said dogs engaging the tapered shoulder on said body.

2. A releasable coupling for connecting well tools and a well string or cable, said coupling comprising a hollow cylindrical body, an internal tapered shoulder adjacent the lower end of said body, means at the upper end of said body for connecting a well string or cable, an annular groove in the inner wall of said body intermediate the length thereof, said groove having an outwardly and downwardly sloping top wall, a shear pin extending across said body above said groove, a dog carrier slidably disposed in said body between said shear pin and said shoulder, said dog carrier comprising a disk-shaped portion having diametrically disposed spring fingers depending therefrom, said fingers terminating in dogs having downwardly and inwardly inclined upper and lower faces, a detent carried by said portion, resilient means urging said detent outwardly of said bore into engagement with the inner surface of said body and a tool connecting member having an elongated stem terminating in an enlarged head with a downwardly and inwardly inclined shoulder connecting said head and said stem, said head being received between said fingers with the upper faces of said dogs engaging the inclined shoulder between said head and said stem and with the lower faces of said dogs engaging the tapered shoulder on said body.

References Cited in the file of this patent

UNITED STATES PATENTS

| | | |
|---|---|---|
| 2,026,295 | Baker | Dec. 31, 1935 |
| 2,128,102 | Sherman | Aug. 23, 1938 |
| 2,605,131 | Marshall et al. | July 29, 1952 |